United States Patent Office 3,450,490
Patented June 17, 1969

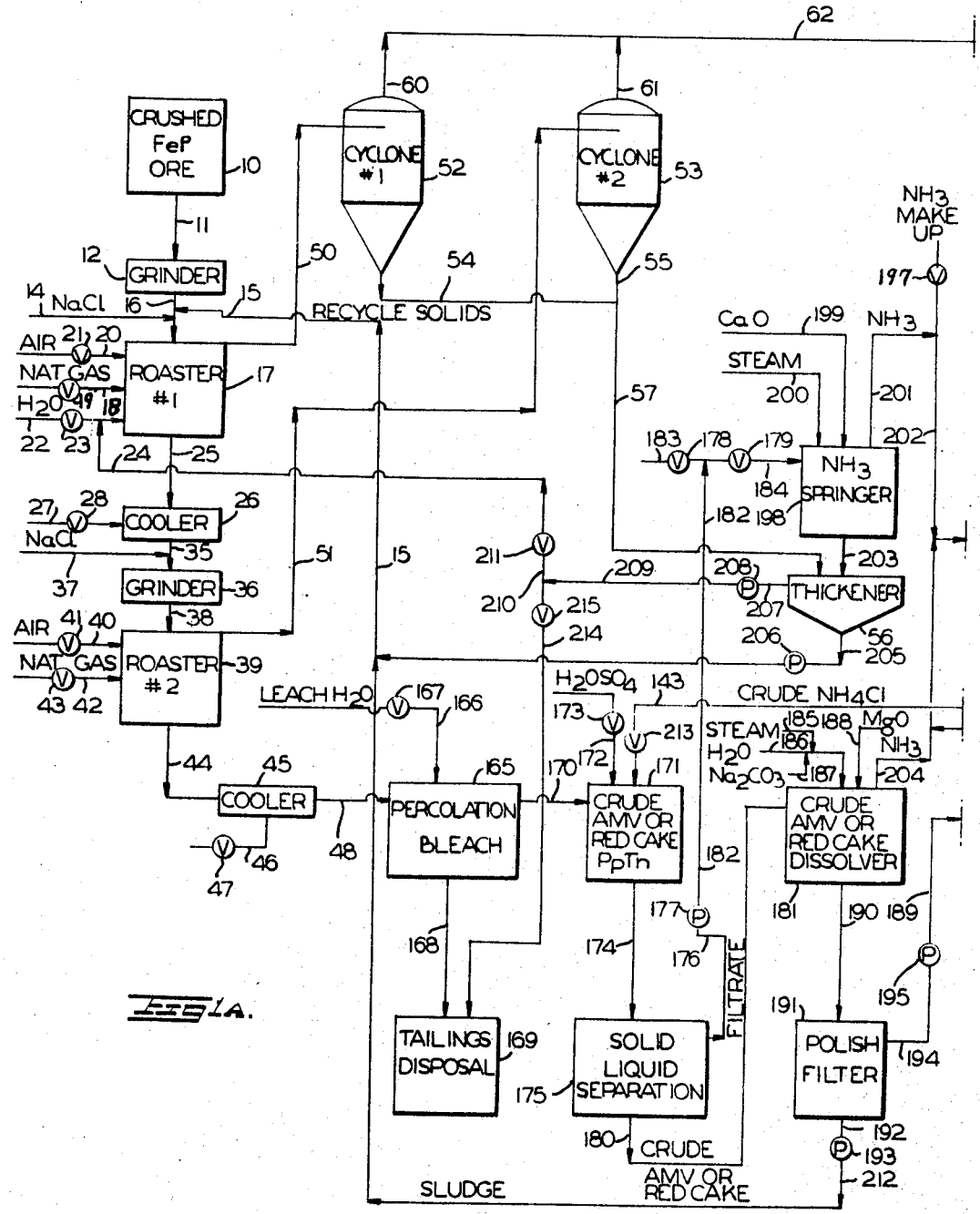

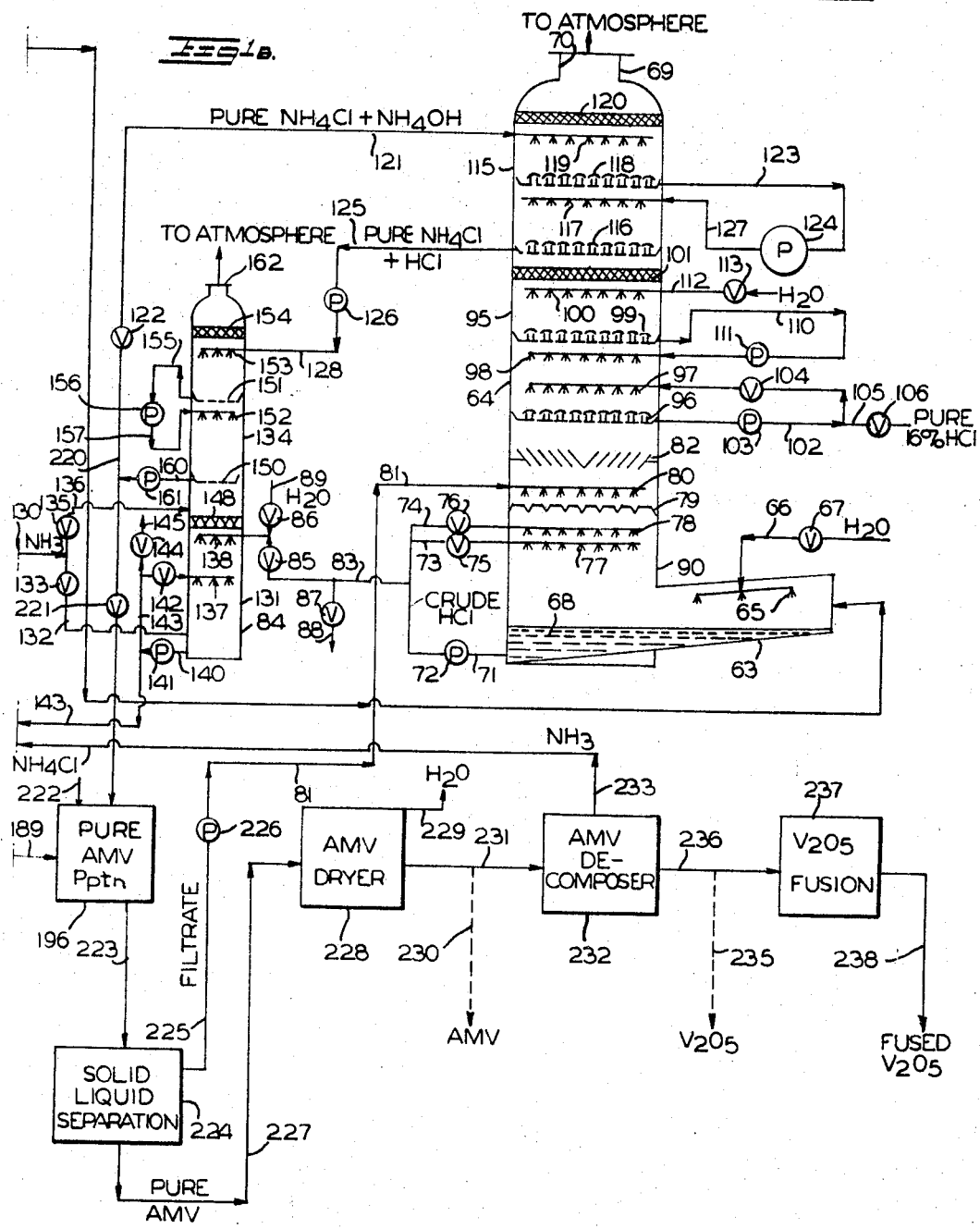

3,450,490
METHOD OF RECOVERING AMMONIA AND HYDROGEN CHLORIDE FROM GASES
John A. Hermann, Oklahoma City, Okla., and Donald E. Garrett, Pomona, Calif., assignors to Kerr-McGee Corporation, a corporation of Delaware
Filed June 26, 1964, Ser. No. 378,307
Int. Cl. B01d 47/00; B03c 3/00
U.S. Cl. 23—2
6 Claims

ABSTRACT OF THE DISCLOSURE

Gaseous ammonia in a first gaseous mixture and gaseous hydrogen chloride in a second gaseous mixture are recovered by a novel method employing improved apparatus. Crude and/or relatively pure ammonium chloride may also be prepared and used in the precipitation and purification of vanadium values.

---

This invention broadly relates to a novel method and improved apparatus for recovering ammonia and acidic substances from gaseous mixtures. In one of its more specific aspects, the invention relates to the recovery of gaseous hydrogen chloride and ammonia from gaseous mixtures. The invention further relates to the preparation of crude and/or relatively pure ammonium chloride from gaseous mixtures containing hydrogen chloride and ammonia, and the use of the resulting ammonium chloride products in the precipitation and purification of vanadium values.

The invention will be illustrated and described hereinafter with specific reference to a process for recovering vanadium values from vanadium bearing ferrophosphorous. However, it is understood that the invention is useful in the recovery of ammonia and acidic substances in general from gaseous mixtures, and also that the invention is useful in numerous environments in addition to the one specifically illustrated and described herein.

Ferrophosphorous usually contains extraneous metal values such as vanadium, chromium, titanium, nickel and manganese. For example, an average analysis for one ferrophosphorous of commerce is 27.5% phosphorous, 7.07% vanadium, 4.67% chromium, 1.23% titanium, 1.36% nickel, 0.2% manganese, 0.4% silicon and the remainder iron. Ferrophosphorous is available in large quantities at low cost and it would be a convenient source material for relatively expensive vanadium provided an economic process for obtaining the vanadium in high purity were made available.

Ferrophosphorous is a reduced product and it is necessary to subject it to an oxidizing roast in order to oxidize the vanadium values to a water soluble state. As is well known, large quantities of contaminating substances such as phosphorous are rendered soluble by conventional roasting procedures in instances where the roast is sufficiently vigorous to result in the solubilization of vanadium values and the contaminates appear in the leach solution and in turn in the vanadium product precipitated therefrom. Phosphorous is an extremely deleterious contaminant and a vanadium concentrate is rendered useless as a commercial vanadium product in instances where the phosphorous values exceed more than about 0.05%.

In accordance with the prior art processes, ferrophosphorous was roasted for a sufficient period of time to solubilize the vanadium with an alkali metal salt such as sodium carbonate or sodium hydroxide as an essential constituent of the roast. However, under these conditions the solubilization of the vanadium also resulted in the solubilization of other substances present in the ferrophosphorous, such as large amounts of phosphorous, chromium, etc., and it was difficult to recover the vanadium values in sufficient purity for sale as a high purity commercial product. In instances where a neutral alkali metal salt was attempted to be used such as sodium chloride, the vanadium was not sufficiently solubilized to enable the vanadium values to be recovered in economic yields and the vanadium was largely retained in the ferrophosphorous upon leaching the roast.

It is possible to roast ferrophosphorous and oxidize the vanadium values to a soluble state while controlling the solubilization of phosphorous at a practical level. The ferrophosphorous may be roasted under oxidizing conditions over a plurality of roasting stages in the presence of a substantially neutral alkali metal chloride salt. The resulting roast may be leached with an aqueous leaching medium to thereby provide a vanadium bearing leach liquor which contains a sufficiently high ratio of vanadium values to phosphorous values to allow the recovery of a vanadium product of commerce of high purity.

One process for the precipitation and purification of a vanadium product of commerce involves the use of ammonium chloride. The ammonium chloride may be added in excess to an aqueous leach liquor containing vanadium values and contaminants to thereby precipitate ammonium metavanadate in a crude or impure form, which may then be redissolved by addition of sodium carbonate, filtered, and additional ammonium chloride added in excess to the filtrate to thereby precipitate a purified ammonium matavanadate product. The purified ammonium metavanadate may be dried, decomposed by heating to produce vanadium oxide, and fused to produce "black cake" of commerce.

The above process utilizes large quantities of ammonium chloride and it is apparent that for the process to be economical, a cheap source of ammonium chloride must be available. In accordance with the present invention, it is possible to recover the gaseous hydrogen chloride produced during the roasting of the ferrophosphorous ore with an alkali metal chloride, and to also recover the ammonia content of the ammonium chloride used for preparing the ammonium metavanadate. Further, the hydrogen chloride and ammonia may be reacted to produce an ammonium chloride product which then may be recycled in the process. The present invention provides an economical method and apparatus for recovering a specification grade vanadium oxide product from ferrophosphorous ore containing relatively large amounts of impurities such as phosphorous. However, it is understood that the invention also has broader aspects and may be employed in the scrubbing of a plurality of gaseous mixtures simultaneously which contain ammonia in one gaseous mixture and an acidic substance in another gaseous mixture.

It is an object of the present invention to provide a novel method and improved apparatus for recovering ammonia and acidic substances from gaseous mixtures.

It is a further object to provide a novel method and improved apparatus for recovering gaseous hydrogen chloride and ammonia from separate gaseous mixtures simultaneously, and to produce an ammonium chloride product therefrom.

It is still a further object to provide a novel method and improved apparatus for the precipitation and purification of a vanadium product as ammonium metavanadate in which ammonium chloride utilized in the precipitation is produced from gaseous mixtures containing ammonia and hydrogen chloride which are produced in the over-all process.

It is still a further object to provide a novel method and improved apparatus for the recovery of a vanadium product of commerce from ferrophosphorous ore wherein the vanadium values are precipitated as ammonium metavanadate and then purified employing ammonium chloride as a precipitant, and wherein the ammonium chloride is produced in the over-all process by scrubbing roaster gases containing hydrogen chloride and by scrubbing ammonia from off gases resulting from decomposition of the ammonium metavanadate.

Still other objects and advantages of the invention will be apparent to those skilled in the art upon reference to the following detailed description, the examples and the drawings, wherein FIGURES I-a and I-b diagrammatically illustrate one suitable arrangement of apparatus for producing a commercial vanadium product of commerce from ferrophosphorous ore which includes the improved apparatus and method of the invention for recovering ammonia and acidic substances simultaneously from separate gaseous mixtures.

Referring now to the drawings, crushed ferrophosphorous ore 10 is passed via conduit 11 to grinder 12 where it is reduced to a fine particle size. Usually, it is preferred that the ferrophosphorous be reduced to a particle size of about −50 to −400 mesh for better results from the standpoint of roasting. One preferred method of reducing the ore to the ultimate particle size is by means of a hammer mill, but the grinder 12 may be other suitable apparatus if desired.

An alkali metal halide, and preferably sodium chloride, is added to the ferrophosphorous via conduit 14 at a suitable stage prior to roasting. Preferably, the salt is added to the ore as about −30 mesh material following reduction to the ultimate particle size by grinder 12. If desired, finely divided recycled vanadium-containing solids may be added to the ground ore via conduit 15, as will be described more fully hereinafter.

The mixture of ground ore and alkali metal halide is passed via conduit 16 to primary roaster 17 where it is subjected to an oxidizing primary roast at a temperature sufficiently low to prevent melting of the ferrophosphorous or a large amount of sintering. The roaster 17 may be fired with natural gas fed thereto via conduit 18 at a rate controlled by valve 19, and air also may be fed via conduit 20 at a rate controlled by valve 21 and in an amount to burn the natural gas and provide an oxidizing atmosphere. For best results, the primary roast is conducted at a temperature of approximately 650–750° C. The roast may be conducted over a period of approximately 1 to 4 hours, although longer or shorter periods may be effective in some instances depending upon the nature of the ore such as from about 30 minutes to 8 hours.

Water may be sprayed or added by other suitable method to the roasting ore via conduit 22 at a rate controlled by valve 23 during at least a portion of the roasting cycle. The added water cools the ore and thereby aids in maintaining the desired temperature range and this is especially desirable during the highly exothermic stages of the roast. The added water also reduces the free chlorine content and assures a higher content of hydrogen chloride in the roaster gases. Additionally, less cooling air is needed to maintain the desired temperature range and the volume of gas withdrawn from the roaster is much less and may be scrubbed much easier for recovery of gaseous hydrogen chloride and other constituents such as vanadium values in entrained dust. The water may be added at the rate of about 0.1–2 lbs. per pound of ore, and preferably 0.5–1.5 lbs. per pound of ore. If desired, the water fed to roaster 17 via conduit 22 may be a vanadium-containing liquor recycled from a later stage in the process via conduit 24.

The hot primary roast may be withdrawn via conduit 25 and passed to cooler 26 where it is cooled to a temperature sufficiently low for the ore to be crushed as it agglomerates to some extent during the roast. The cooling or quenching step in cooler 26 may be accomplished by allowing the hot roast to cool in air at ambient temperature, air or steam may be passed over the hot roast, or it may be sprayed with sufficient water to allow cooling without actual immersing in water. Whatever the cooling fluid, it may be supplied to cooler 26 via conduit 27 at a rate controlled by valve 28. The hot roast also may be quenched by submersion in water but this not usually desirable.

The coded ore may be withdrawn from cooler 26 via conduit 35 and passed to grinder 36 where it may be reduced to a particle size not greater than about −3 mesh and preferably not greater than −10, or to a smaller particle size as about −50 to −400 mesh. Also, an additional quantity of alkali metal halide, and preferably sodium chloride may be added via conduit 37 and mixed with the ore, and preferably prior to grinding so that the salt is intimately mixed throughout the ore and ground therewith to provide a fine particle size. For best results, the ore should be at a temperature not greater than about 100–200° C. during the grinding step following the primary roast. In some instances, all of the alkali metal halide may be added via conduit 14 prior to the primary roast and a further addition prior to the secondary roast is not necessary in such instances.

Ground ferrophosphorous ore from the primary roast may be withdrawn via conduit 38 and passed to the second roaster 39 where it is subjected to a secondary roast under oxidizing conditions at a temperature of approximately 600–800° C. The secondary roast may be conducted in the presence of air supplied via conduit 40 at a rate controlled by valve 41 in an amount to provide an oxidizing atmosphere and burn the natural gas which is fed via conduit 42 at a rate controlled by valve 43. The secondary roast may be conducted over a period of approximately 1 to 4 hours, but longer or shorter periods may be satisfactory such as from 30 minutes to 8 hours. The ore then may be withdrawn via conduit 44 and passed to cooler 45 where it may be air or steam cooled, or it may be quenched by means of a water spray wherein water is sprayed on the ore in a sufficient quantity to reduce its temperature without immersing in a pool of water. A cooling fluid, whether it be air, steam or water, may be fed to cooler 45 via conduit 46 at a rate controlled by valve 47. The hot roasted ore also may be quenched by immersing in water so as to fracture the agglomerates but this is not necessary and usually is not preferred when a percolation leaching step is used for solubilizing the vanadium values. The cooled roasted ore is withdrawn from cooler 45 via conduit 48 and processed for the recovery of solubilized vanadium values therefrom in a manner which will be described more fully hereinafter.

Hot roaster gases containing the products of combustion, gaseous hydrogen chloride, and finely divided entrained solids, or dust is withdrawn from roasters 17 and 39 via conduits 50 and 51 and passed to cyclones 52 and 53, respectively. A substantial proportion of the suspended finely divided solids are removed from the roaster gases by cyclones 52 and 53, and withdrawn therefrom via conduits 54 and 55, respectively, and passed to thickener 56 via conduit 57.

The roaster gases withdrawn from cyclones 52 and 53 via conduits 60 and 61, respectively, still contain some entrained dust, and are passed via conduit 62 into lateral extension 63 of hydrogen chloride scrubber 64. As the incoming roaster gases pass laterally through extension 64, some hydrogen chloride and entrained dust is removed from the gases by means of sprays 65, to which water is fed via conduit 66 at a rate controlled by valve 67. Thus, the body of liquid 68 collecting in the bottom of scrubber 64 is a dilute hydrochloric acid containing suspended dust particles.

The roaster gases pass upward through scrubber 64 and are finally withdrawn from the top 69 via conduit 70, and discharged to the atmosphere. As the roaster gases rise from the bottom of scrubber 64, they are contacted with crude hydrochloric acid withdrawn from body 68 via conduit 71 and transferred by pump 72 through conduits 73 and 74 at rates controlled by valves 75 and 76 to sprays 77 and 78, respectively. Additional entrained dust is removed and additional hydrochloric acid is absorbed from the gases due to contact with sprays 77 and 78, and then the roaster gases are passed through venturi plate 79. The roaster gases continue to pass upward through the scrubber 64 and are contacted with sprays 80 and are then passed through a vane-type demister 82. The sprays 80 are fed with filtrate from a pure ammonium metavanadate precipitation step to be described more fully hereinafter via conduit 81.

The sprays 65, 77, 78 and 80, venturi plate 79 and demister 82 form a lower portion 90 of the scrubber 64 in which crude hydrochloric acid is prepared containing suspended dust and also some ammonium chloride due to the ammonium chloride content of the filtrate fed via conduit 81. This crude hydrochloric acid may be fed via conduit 83 to ammonia scrubber 84 upon opening valve 85 and closing valves 86 and 87, or all or a portion thereof may be withdrawn via conduit 88 upon opening valve 87 and closing valve 85 and discarded.

The scrubber 64 has an intermediate portion 95 in which relatively pure hydrochloric acid may be prepared if desired. The intermediate section 95 may include bubble tray 96, sprays 97 and 98, bubble tray 99, sprays 100, and a wire mesh demister 101. The sprays 97 are supplied with recycled hydrochloric acid which is withdrawn from bubble tray 96 via conduit 102 and transferred by pump 103 at a rate controlled by valve 104. If desired, a relatively pure hydrochloric acid product may be withdrawn via conduit 105 upon opening or partially opening valve 106. Similarly, dilute hydrochloric acid collecting on tray 99 may be withdrawn via conduit 110 and transferred by pump 111 to sprays 98 where it is contacted with the rising roaster gases. Fresh water may be fed to sprays 100 via conduit 112 at a rate controlled by valve 113. The roaster gases flowing upward through portion 95 of scrubber 64 pass consecutively through bubble tray 96, sprays 97 and 98, bubble tray 95, sprays 100, and finally wire mesh demister 101, and additional hydrogen chloride is absorbed.

In instances where the roaster gases have a high hydrogen chloride content initially relatively pure hydrochloric acid may be prepared within portion 95. However, if little hydrogen chloride is present and it is absorbed in the lower portion 90, then pure hydrochloric acid will not usually be prepared in portion 95. In such instances, it may be desirable to omit the feed of fresh water via conduit 112 and merely recirculate a hydrochloric acid solution in conduits 110 and 102, or an ammonium chloride solution which contains some free hydrochloric acid.

The scrubber 64 also has an upper portion 115 in which an aqueous solution containing ammonium chloride and free hydrogen chloride may be prepared. The portion 115 includes bubble tray 116, sprays 117, bubble tray 118, sprays 119 and wire mesh demister 120. An aqueous solution containing ammonium chloride and free ammonium hydroxide is fed to sprays 119 via conduit 121 at a rate controlled by valve 122 and intimately contracted with the rising roaster gases by means of sprays 119. The solution collects on bubble tray 118, and is withdrawn via conduit 123 and is transferred by pump 124 via conduit 127 to sprays 117 where it is again contacted with the rising roaster gases but at a lower level. The solution collecting on bubble tray 116 is withdrawn via conduit 125 and is transferred by pump 126 via conduit 128 to ammonia scrubber 84. As the roaster gases rise within portion 115, the last traces of hydrogen chloride are removed by reaction with the ammonium hydroxide content of the solution fed via conduit 121 and additional ammonium chloride is formed which immediately dissolves in the solution. Preferably the volume of solution fed via conduit 121 is controlled so that sufficient hydrogen chloride is present in the roaster gases to neutralize the free ammonium hydroxide content and also provide some absorbed free hydrochloric acid in the solution withdrawn via conduit 125. After passing through bubble trays 116 and 118, the sprays 117 and 119, the roaster gases are substantially free of gaseous hydrogen chloride and continue upward through wire demister 120 where mist is removed. The gases are then discharged via conduit 70 to the atmosphere.

The ammonia scrubber 84 is operated in conjunction with hydrogen chloride scrubber 64 so as to cooperate therewith and provide for efficient and substantially complete removal of ammonia and hydrogen chloride from the respective gaseous mixtures. An ammonia-containing gaseous mixture flowing in conduit 130 is passed to the bottom section 131 of scrubber 84 via conduit 132 upon opening valve 133. If desired, a portion of the gaseous mixture may be fed to the upper section 134 upon cracking valve 135 in conduit 136.

The lower section 131 is provided with sprays 137 and 138. Sprays 138 may be fed with the crude hydrochloric acid solution flowing in conduit 83 upon opening valve 85 and closing valves 86 and 87, or with water upon closing valve 85 and opening valve 86 in conduit 89. The sprays 137 may be fed with the liquid collecting in the bottom of scrubber 84 which is withdrawn via conduit 140 and transferred by pump 141 via conduit 143 to sprays 137 upon opening valve 142 and closing valve 144.

In instances where the crude hydrochloric acid is fed to sprays 138 via conduit 83, the ammonia content of the gases rising within section 131 is neutralized by the hydrochloric acid and a crude ammonium chloride solution is formed which collects in the bottom of section 131 and is withdrawn via conduit 140. In instances where water is fed to sprays 138, then an ammonium hydroxide solution is prepared which likewise collects in the bottom of scrubber 84 and is withdrawn via conduit 140. The crude ammonium chloride solution or the crude ammonium hydroxide solution may be withdrawn via conduit 145 if desired upon opening valve 144.

The rising gases are passed through wire mesh demister 148 and into the upper section 134 which is capable of producing a substantially pure ammonium chloride solution containing free ammonium hydroxide. The upper section 134 includes spaced trays 150 and 151 which may be of the bubble type, sprays 152 positioned between trays 150 and 151, sprays 153 arranged above tray 151, and a wire mesh type demister 154. A substantially pure ammonium chloride solution containing some free hydrochloric acid may be withdrawn from hydrogen chloride scrubber 64 via conduit 125, and transferred by pump 126 via conduit 128 to sprays 153 where it is contacted with the gaseous mixture rising within section 134. The liquid collecting upon tray 151 is withdrawn via conduit 155 and is transferred by pump 156 via conduit 157 to sprays 152 where it is contacted with the rising gases. The liquid collecting upon tray 150 is a substantially pure ammonium chloride solution which also may contain free ammonium hydroxide, and it may be withdrawn via conduit 160 and transferred by means of pump 161 via conduit 121 and open valve 122 to scrubber 64. The gases rising within section 134 are scrubbed substantially free of the ammonia content by means of the liquid of sprays 152 and 153, and are then passed through demister 154 and are discharged through conduit 162 to the atmosphere.

The hydrogen chloride scrubber 64 is preferably operated so that a substantially pure ammonium chloride solution containing some free hydrochloric acid is withdrawn via conduits 125 and 128 and fed to sprays 153 to thereby provide a free hydrogen chloride for reaction with the last traces of the gaseous ammonia rising in section 134 and completely remove the same. Similarly, ammoniator 84 is preferably operated so that the solution withdrawn via conduit 160 contains pure ammonium chloride and some free ammonium hydroxide whereby free ammonium hydroxide is available for reaction with the last traces of the gaseous hydrochloride content of the roaster gases and thereby completely remove the same. The pure ammonium chloride solution also may be used for pure ammonium metavanadate precipitation as will be described hereinafter.

If desired, it is possible to produce a relatively pure hydrochloric acid in section 95 of scrubber 64 such as 16% hydrochloric acid which may be withdrawn and sold as a product. In instances where it is not desired to produce a pure hydrochloric acid product, then the section 95 may be prevented from absorbing a substantial amount of hydrogen chloride by omitting the water fed via conduit 112 to sprays 100, and merely circulating a hydrochloric acid solution or an ammonium chloride solution in conduits 102 and 110. It is also possible to produce a crude hydrochloric acid in the lower section 90 which may be used in absorbing ammonia from the bottom section 131 of ammonia scrubber 84. The resulting crude ammonium chloride solution may be used in the over-all process of the invention for the precipitation of a crude ammonium metavanadate product as will be more fully discussed hereinafter.

In instances where the crude hydrochloric acid product is not passed to sprays 138, it may be withdrawn via conduit 88 upon opening valve 87 and closing valve 85 and is discarded. Similarly, in instances where the crude ammonium chloride solution is not used for crude ammonium metavanadate precipitation, it may be withdrawn via conduit 145 upon opening valve 144 and is discarded.

As is pointed out above, the crude and pure ammonium chloride produced by the hydrogen chloride scrubber 64 and the ammonia scrubber 84 may be employed in the precipitation and purification of the vanadium values in the over-all process of the invention. This variant of the invention will now be described in greater detail.

After cooling in cooler 45, the roasted ore may be passed to a leaching step as indicated at 165 where it is leached with water supplied via conduit 166 at a rate controlled by valve 167. Preferably, a percolation leach is conducted but agitation leaching may be employed if desired. Leaching of the ore with the smallest possible volume of water produces a slightly alkaline sodium vanadate solution containing about 10–80 grams of $V_2O_5$ per liter which is contaminated with chromium and phosphate values. The leached ore may be withdrawn via conduit 168 and is passed to tailings disposal 169, and the leached liquor may be withdrawn via conduit 170 and is passed to crude ammonium metavanadate or red cake precipitation 171.

In instances where a red cake precipitation is conducted, the pH value of the leach liquor may be reduced to about 2.5 by addition of sulfuric acid via conduit 172 at a rate controlled by valve 173. The precipitated red cake and mother liquor is withdrawn via conduit 174 and is passed to solid-liquid separation 175. The filtrate is withdrawn via conduit 176 and is transferred by pump 177 via conduit 182 to conduit 183 and is discarded upon opening valve 178 and closing valve 179. The red cake may be transferred via conduit 180 to crude ammonium metavanadate or red cake dissolver 181 where it is dissolved by addition of steam, water and sodium carbonate via conduits 185, 186 and 187, respectively. The steam is added in an amount to provide a dissolving temperature of about 180° F. and the sodium carbonate in a quantity sufficient to dissolve the red cake and form an alkaline carbonate solution. Additionally, a small amount of magnesium oxide such as about 50–500 pounds for each 7,500 gallons of liquor may be added via conduit 188 to reduce silica contamination in instances where this is desirable. The resulting alkaline vanadium solution is withdrawn via conduit 190 and passed to polish filter 191 where insoluble matter is removed as a sludge. The sludge is withdrawn via conduit 192 and is transferred by pump 193 via conduits 212, 15 and 16 to roaster 17. The clarified vanadium solution is withdrawn via conduit 194 and is transferred by pump 195 via conduit 189 to pure ammonium metavanadate precipitation 196.

In instances where crude ammonium metavanadate is precipitated, crude ammonium chloride solution is withdrawn from the bottom of scrubber 84 via conduit 140 and is transferred by pump 141 via conduit 143 and open valve 213 to vessel 171. The crude ammonium chloride is added in excess in order to obtain massive phosphate and chromium rejection while precipitating most of the vanadium values. The bulk of the phosphate and chromium remain in solution in the mother liquor and a slightly contaminated ammonium metavanadate precipitate is produced which is then passed via conduit 174 to solid-liquid separation 175. The filtrate is withdrawn via conduit 176 and is transferred by pump 177 to ammonia springer 198 via conduits 182 and 184 upon opening valve 179 and closing valve 178. The ammonia content of the filtrate may be recovered in ammonia springer 198 for recycle by addition of calcium oxide via conduit 199 and steam via conduit 200. The resulting gaseous ammonia is passed via conduits 201, 202 and 130 to scrubber 84 for recovery. The sludge formed within ammonia springer 198 is withdrawn via conduit 203 and passed to thickener 56.

Crude ammonium metavanadate is withdrawn via conduit 180 and passed to dissolver 181 where it is dissolved by adding sodium carbonate via conduit 187, water via conduit 186, and steam via conduit 185 to provide a temperature of about 180° F. The crude ammonium metavanadate decomposes with evolution of gaseous ammonia which is passed via conduits 204, 202 and 130 to scrubber 84 for recovery and recycle. The resulting solution of sodium vanadate contains undissolved impurities and it is withdrawn via conduit 190 and passed to polish filter 191. The insoluble material is withdrawn as a sludge via conduit 192 and is transferred by pump 193 via conduits 212, 15 and 16 to roaster 17. The clarified sodium vanadate solution is withdrawn via conduit 194 and is transferred by pump 195 via conduit 189 to pure ammonium metavanadate precipitation 196.

The thickener 56 receives recycle solids from cyclones 52 and 53 via conduit 57 and ammonia springer 198 via conduit 203. The solids are discharged in the form of a slurry via conduit 205 and are transferred by pump 206 to conduit 15, and combined with the sludge flowing in conduit 212. The combined solids are then transferred to roaster 17 via conduits 15 and 16 to thereby recover the vanadium content. The clarified liquor is withdrawn from thickener 56 via conduit 207 and is transferred by pump 208 via conduit 209 to conduit 210. The liquor then may be passed to roaster 17 via conduits 210, 24 and 22 upon opening valve 211 and closing valve 215. All or part of the liquor also may be passed to tailings disposal 169 via 214 upon opening valve 215 and closing valve 211.

A pure ammonium metavanadate product may be precipitated from the sodium vanadate solution passed to vessel 196 by addition of excess ammonium chloride. If desired, a pure ammonium chloride solution produced in section 134 of ammonia scrubber 84 may be withdrawn via conduit 160 and transferred by pump 161 via conduit 220 to vessel 196 upon opening valve 221. Ammonium chloride also may be added via conduit 222 in instances where sufficient ammonium chloride is not produced in scrubber 64 and scrubber 84. The precipitated pure ammonium metavanadate is withdrawn via conduit 223 and passed to liquid solid separation 224. The resulting filtrate is withdrawn via conduit 225 and transferred by pump 226 via conduit 81 to sprays 80. Thus, the ammonium values present in the filtrate are ultimately recycled in the process and recovered, thereby increasing the efficiency.

A pure ammonium metavanadate product is withdrawn via conduit 227 and passed to dryer 228 where water is removed as a vapor via conduit 229. The dried ammonium metavanadate may be withdrawn as a product as indicated by line 230, or passed via conduit 231 to decomposer 232 where it is heated sufficiently to evolve ammonia and produce a vanadium oxide product. The ammonia evolved is withdrawn via conduit 233 and is passed via conduits 202 and 130 to scrubber 84 for recycle.

The vanadium oxide product may be withdrawn as indicated by line 235 as a final product of commerce, or passed via conduit 236 to vanadium oxide fusion 237 and fused vanadium pentaoxide withdrawn via conduit 238 as the product of commerce.

While the novel method and improved apparatus of the invention for recovering ammonia and acidic substances from gaseous mixtures has been illustrated and described herein with specific reference to a process for recovering vanadium values from vanadium-bearing ferrophosphorus, it is understood that the invention is useful in numerous other environments. For instance, the improved two-column scrubber system is useful in scrubbing a variety of gaseous mixtures which contain a substance that produces an acidic reaction or solution when dissolved in water. Examples of acidic substances which may be present in the gaseous mixture include gaseous hydrogen halides such as hydrogen chloride and hydrogen fluoride, gaseous sulfur oxides such as sulfur dioxide and sulfur trioxide, oxides of nitrogen, carbon dioxide, and oxides of phosphorus which may be entrained in the gaseous mixture in the form of solid particles such as phosphorus pentoxide. Still other acidic substances may be present in the gaseous mixtures to be scrubbed as will be apparent to those skilled in the art in view of the above teachings.

Scrubbers 64 and 84 are illustrated in the drawings with sprays of liquids being used to intimately contact the gaseous mixtures with the absorbing aqueous media. However, it is understood that other gas-liquid contacting means may be employed including packed columns, bubble trays, etc.

It is preferred to leach the cooled roasted ore with the smallest possible volume of water to thereby produce a slightly alkaline sodium vanadate solution. The resulting liquor is contaminated with chromium and phosphate in amounts whereby purification of the initially precipitated product is necessary. Normally, the $V_2O_5$ to $P_2O_5$ ratio is not higher than about 10–15:1, and is often as low as 2–3:1.

The high phosphate content of the leach liquor has a deleterious influence on the ammonia metavanadate precipitation and to overcome this and to obtain acceptable recoveries, a significant excess of ammonium chloride should be added. It is desirable to have the vanadium-containing liquor as concentrated in vanadium values as possible, such as 40–60 grams per liter of $V_2O_5$ or higher, and to provide an excess of at least 25 grams per liter of ammonium chloride in the solution. Good results are obtained with 25–100 grams per liter of excess ammonium chloride and preferably 75–100 grams per liter. The excess of ammonium chloride remaining in the mother liquor after separation of the precipitated ammonium metavanadate product may be recovered and recycled. Additionally, the vanadium values remaining in the filtrate may be recovered for recycle in the process, thereby increasing the overall efficiency.

The amount of alkali metal halide which is added to the ore during roasting may be varied over wide ranges. In most instances and especially when the ore is ferrophosphorus, it is preferred that the total amount of alkali metal halide be approximately 0.35 to 2 parts by weight for each part by weight of ore. For best results, it is usually preferred that all of the alkali metal halide be added prior to the primary roast, but if desired it also may be added in two stages with about 5–95% being added prior to the primary roast and approximately 95–5% prior to the secondary roast. When the ferrophosphorus contains about 7% vanadium, then a total of about 0.7 part by weight of the alkali metal halide per part by weight of ferrophosphorus is used for best results although this may vary somewhat with the vanadium content. For instance, when sodium chloride is used as the alkali metal halide, it is preferred that the weight ratio of sodium chloride to vanadium in the ore vary between 5:1 and 20:1, and preferably is about 10:1.

Ferrophosphorus is a reduced product and it is essential that it be subjected to an oxidizing roast. In most instances, air is passed over the ore during the roast in quantities sufficient to assure an oxidizing atmosphere. This also has the desirable effect of cooling the highly exothermic reaction and air at ambient temperature may be supplied in a volume sufficient to assure that the desired temperature range is maintained. In such instances, a much larger quantity of air is supplied than is normally necessary to assure an oxidizing atmosphere and therefore a larger volume of roaster gas results. It is often preferred that cooling be accomplished at least in part by adding water to the roast during the roasting procedure by means of a water spray so as to allow the desired temperature range to be maintained without the necessity for large volumes of cooling air. This also has the beneficial effect of markedly increasing the amount of hydrogen chloride in the roaster gases, and therefore additional ammonium chloride may be produced in scrubbers 64 and 84 for use in precipitating the vanadium values from the leach liquor.

In still another variant of the invention, magnesium oxide and/or calcium oxide, or magnesium or calcium salts which are capable of yielding these substances in the roaster, may be added to the ore at a stage prior to the roasting step to reduce the amount of phosphorus in the leach liquor. Only a small amount will cause some phosphorus rejection, such as up to 0.1 pound of magnesium or calcium oxide or the equivalent per pound of ore. It is preferred that the magnesium or calcium oxide be added prior to the second roast although some beneficial effect is observed when it is added prior to the first roast. Better results may be obtained in some instances by adding small amounts to both the primary and secondary roasts.

The time periods for the primary and secondary roasts may vary over wide ranges. It is preferred that the primary roast be conducted for a period of time as is required to assure a pH value of not less than 3.3, and for best results a pH value of 5.5 or higher, upon quenching or leaching a portion of the crushed roasted ore in a minimum amount of water. Normally, the primary roast is yellow to brown-yellow in color at this stage, and the pH value of the quench or leach water will be greater than 3.3 and preferably greater than 5.5 with substantially no ferrous iron being present in the roast. Even better results are obtained when the pH value is at least 6.0, and best results are often obtained at pH values of about 6.6 to 6.9 or higher. In carrying out this test, it is necessary that the ferrophosphorus from the primary roast be sufficiently finely divided to assure that the quenching or leaching water reaches the interior of the particles as otherwise a true test is not obtained. The secondary roast should be conducted for a period of time as is necessary to provide a pH value of at least 6.5 to 7.0 or higher in a smaller amount of water used to quench or leach a portion of the crushed roasted ore, and best results are obtained when the pH value is 7.5 to 8.0 or higher. When the primary and secondary roasts are conducted as described above, then a maximum amount of the vanadium and a minimum amount of undesirable impurities such as phosphorus are solubilized.

The foregoing detailed description, the illustrative drawings, and the following specific examples are for purposes of illustration only, and are not intended as being limiting to the spirit or scope of the appended claims.

EXAMPLE I

Ferrophosphorus containing 27.5% P, 7.07% V, 4.67% Cr, 1.23% Ti, 1.36% Ni, 0.2% Mn, 0.4% Si and the remainder Fe, by weight, and having a particle size of approximately 2 to 3 inches is fed to a gyratory crusher where the particle size is reduced to about 1½ inches. The gyratory crusher discharge is fed to a standard cone crusher which in turn discharges material to a vibrating screen fitted with a ¼-inch aperture screen. The screen oversize is fed to a Pennsylvania impactor where it is reduced to a size passing the screen, and the screen undersize, ¼-inch material, is used as ball mill feed. Further grinding is conducted in a Hardinge airswept mill using a 270 M screen specification as a control. A screen analysis of the output indicates that the −270 M fraction is about 75% and the +150 M fraction is about 8%. Sodium chloride in an amount of 0.5 pound per pound of ferrophosphorus is mixed with the output from the Hardinge mill and the mixture is passed to a rod mill where it is ground to −100 mesh.

The mixture of ground ore and salt is fed to a primary roaster and is subjected to a primary oxidizing roast at a temperature of 650–725° C. until a sample of the roasted ore when crushed and immersed in a small amount of water results in a pH value of 6.5 in the water. This requires a roast of about four hours. Then, the calcine is cooled from the roasting temperature to 100° C. by passing air at ambient temperature thereover. A satisfactory and more rapid quench is achieved by spraying droplets or a mist of water on the hot roasted ore in quantities sufficient to cool the ore without immersing it in a pool of liquid water.

The cooled ore from the primary roaster is ground to −100 mesh in a ball mill. Prior to feeding the ore to the ball mill, 0.25 lb. of sodium chlorine per pound of ferrophosphorus is added and the mixture is fed to the ball mill for the purpose of assuring a desired particle size and thorough mixing of the salt with the roasted ore.

The output from the ball mill is fed to a secondary roaster and subjected to a secondary oxidizing roast at a temperature of 650–725° C. The secondary roast is continued for a period of time sufficient to result in a pH of 8 when a sample of the calcine is crushed and quenched in a small amount of water. The secondary roast requires about three hours. In both the primary and secondary roasts an oxidizing atmosphere is provided and the ore is cooled during the exothermic reaction by passing excess air at ambient temperature over the roasting ore.

The hot calcine from the secondary roaster is cooled to below 100° C. by passing air thereover. It is also possible to spray water on the hot ore and thereby achieve a faster rate of cooling without adversely affecting the particle size of the roasted ore. The particle size of the cooled ore is substantially the same as that of the hot roasted ore leaving the secondary roaster.

The roaster gases containing hydrogen chloride are passed through cyclones for removal of most of the entrained dust and then to a hydrogen chloride scrubber 64. The roaster gases enter scrubber 64 via conduit 62 at a temperature of about 1000° F., and are partially cooled to 400–500° F., dust is removed and hydrogen chloride is absorbed by means of water sprays 65 to produce a crude hydrochloric acid solution. The sensible heat left in the gases is then used to evaporate water as the gases continue to pass up the scrubber. The roaster gases are contacted with solution from sprays 77, 78 and 80 and tray 79 and are further cooled to about 180° F., and additional dust and hydrogen chloride are removed. The gases are then passed through demister 82 where any mist present is removed.

The roaster gases are passed into section 95 while still containing most of the hydrogen chloride content and contacted with fresh water from sprays 100 in an amount regulated to produce about 16% by weight of hydrochloric acid due to absorption of the hydrogen chloride content. The concentration of the hydrochloric acid produced initially is increased by withdrawing liquid from trays 96 and 99 and recycling to sprays 97 and 98 for absorption of additional hydrogen chloride. A substantially pure hydrochloric acid product is produced in section 95 and withdrawn from conduit 105 upon opening valve 106.

The roaster gases passing upward through demister 101 contain some hydrogen chloride. The gases are contacted in section 115 by means of sprays 117 and 119 with an ammonium chloride solution from ammonia scrubber 84 which also contains some free ammonium hydroxide. This removes the final traces of hydrogen chloride, and also produces a pure ammonium chloride solution which is changed from basic to acidic in nature due to the neutralization of the free ammonium hydroxide and acidification with hydrogen chloride absorbed within section 115. The acidified solution is withdrawn via conduit 125 and transferred by pump 126 via conduit 128 to the upper section 134 of ammonia scrubber 84. The roaster gases are now free of gaseous hydrogen chloride and are passed through demister 120 and exhausted to the atmosphere via conduit 70.

A gaseous mixture containing ammonia from the ammonia springer and ammonium metavanadate decomposer, and make-up ammonia, is passed to the lower section 131 of ammonia scrubber 84 and contacted therein with crude hydrochloric acid produced in section 90 of scrubber 64 by means of sprays 138. The resulting crude ammonium chloride solution is recycled to sprays 137 until it is sufficiently concentrated, and then it is used in the crude ammonium metavanadate precipitation step to be described hereinafter. The ammonia-containing gases are passed upward through demister 148 into upper section 134 where they are contacted with the pure ammonium chloride solution containing free hydrochloric acid which is withdrawn from the upper section 115 of scrubber 64 via conduit 125 and fed to sprays 153. The acidified solution is neutralized and a basic solution is formed due to the absorption of sufficient ammonia to produce free ammonium hydroxide. A portion of the basic ammonium chloride solution is recycled via conduit 121 to the upper section 115 of hydrogen chloride scrubber 64 for removing the last traces of hydrogen chloride from the roaster gases. The substantially pure ammonium chloride solution is recycled between the sections 115 and 134 until it is concentrated, and then a portion is withdrawn via conduit 220 and is used in the pure ammonium metavanadate precipitation step as will be described hereinafter.

Four vats arranged in series are filled with the cooled ore from the secondary roaster and then the ore is percolation leached with water using about one ton of water per ton of ore. The leach liquor is advanced through the four vats in series at a rate sufficient to assure contact with the ore over a 24 hour period. Also, the process is operated continuously with a fresh vat of ore being placed on stream in contact with the most concentrated leach liquor when the first vat in the series is completely leached.

Roasting and percolation leaching in accordance with this example results in the solubilization of 91–92% of the original vanadium content of the ferrophosphorus and the recovery of substantially all of the solubilized vanadium. It is not necessary to crush the roasted ore to a smaller particle size to achieve as complete a recovery as would have been possible with agitation leaching of the crushed roasted ore.

The leach liquor contains approximately 50 g./l. of $V_2O_5$, 20 g./l. of $P_2O_5$, 0.5 g./l. of chromium, 25 g./l. of chloride ion and 50 g./l. of sodium ion. The vanadium values are recovered by precipitation with excess crude ammonium chloride solution withdrawn from section 131 of scrubber 84 to produce a crude ammonium metavanadate product. The crude ammonium metavanadate is purified by dissolving in a slight excess of sodium carbonate.

the solution is filtered, and ammonium metavanadate is reprecipitated in the pure form by addition of excess pure ammonium chloride solution withdrawn from section 134 of scrubber 84. The pure ammonium metavanadate is decomposed by heating to an elevated temperature to produce vanadium pentoxide, which is fused to black cake. The filtrate from the pure ammonium metavanadate precipitation is passed to sprays 80 in scrubber 64 whereby the ammonia and vanadium values are recycled and recovered. The filtrate from the crude ammonium metavanadate precipitation is treated with calcium oxide and heated to evolve gaseous ammonia, which is combined with the gaseous ammonia produced upon decomposition of the pure ammonium metavanadate and passed to scrubber 84 for recovery. The black cake thus produced contains more than 98% $V_2O_5$, less than 0.05% phosphorus, less than 0.02% sulfur, less than 0.5% sodium and potassium oxide, less than 0.2% arsenic, less than 0.5% silica and less than 0.5% iron.

EXAMPLE II

The procedure of Example I is followed except as noted below.

In the procedure of Example I, sufficient cooling air is supplied to the roasters to provide the desired temperature range during the exothermic portion of the roast. This results in a large volume of gases exiting from the primary roaster and it is difficult to adequately scrub the large volume of roaster gases free of the gaseous hydrogen chloride.

About 1.0–1.5 lbs. of water for each pound of ferrophosphorus is sprayed on the ore on the first two trays of the roaster and sufficient atmospheric air is supplied thereto to produce an oxidizing atmosphere. This modification controls the roasting temperature and reduces the output of gases from the roaster to a level whereby it is easy to scrub the gaseous hydrogen chloride content without any difficulty. Also, unexpectedly there is a sharp increase in the total amount of hydrogen chloride in the roaster gases. Thus, the procedure of this example enables the preparation of additional hyrochloric acid which may be utilized for the preparation of amomnium chloride for the precipitation of ammonium metavanadate.

What is claimed is:

1. A method of recovering gaseous ammonia from a first gaseous mixture and gaseous hydrogen chloride from an impure second gaseous mixture comprising the steps of passing at least a portion of the first gaseous mixture containing gaseous ammonia into a first gas-liquid contacting zone, intimately contacting the first gaseous mixture in the first contacting zone with a aqueous acidic medium in an amount to absorb a portion of the gaseous ammonia contained in the said first gaseous mixture and neutralize the acid content of the acidic medium, passing the first gaseous mixture which is not absorbed in the first contacting zone into a second gas-liquid contacting zone, intimately contacting the first gaseous mixture in the second contacting zone with an aqueous medium to produce a first aqueous effluent containing absorbed ammonia, passing the impure second gaseous mixture containing gaseous hydrogen chloride and entrained finely divided inorganic dust particles into a third gas-liquid contacting zone, intimately contacting the second gaseous mixture in the third contacting zone with an aqueous medium in an amount to remove the entrained dust particles therefrom without absorbing all of the gaseous hydrogen chloride whereby a second aqueous effluent is produced which contains the dust and absorbed hydrogen chloride, withdrawing unabsorbed second gaseous mixture containing gaseous hydrogen chloride from the third contacting zone and passing it into a fourth gas-liquid contacting zone, intimately contacting the second gaseous mixture in the fourth contacting zone with an aqueous medium in an amount to produce an aqueous solution of hydrogen chloride without absorbing all of the gaseous hydrogen chloride therefrom, withdrawing unabsorbed second gaseous mixture containing gaseous hydrogen chloride from the fourth contacting zone and passing it into a fifth gas-liquid contacting zone, intimately contacting the second gaseous mixture in the fifth contacting zone with an aqueous medium to produce a third aqueous effluent containing absorbed hydrogen chloride, withdrawing first aqueous effluent containing absorbed ammonia from the second contacting zone and passing at least a portion thereof into the fifth contacting zone as the aqueous medium to be initimately contacted with the second gaseous mixture, withdrawing the second aqueous effluent from the third contacting zone and passing it into the first contacting zone as the aqueous acidic medium, withdrawing the third aqueous effluent from the fifth contacting zone and passing at least a portion thereof into the second contacting zone as the aqueous medium to be intimately contacted with the said first gaseous mixture, withdrawing a fourth aqueous effluent containing impure ammonium chloride from the first contacting zone, withdrawing a fifth aqueous effluent containing absorbed hydrogen chloride from the fourth contacting zone, withdrawing a first gaseous effluent from the second contacting zone having a lower gaseous amomnia content than was present initially in the first gaseous mixture, and withdrawing a second gaseous effluent from the fifth contacting zone having lower contents of gaseous hydrogen chloride and dust than were present initially in the second gaseous mixture.

2. The method of claim 1 wherein the amomnia content of the first gaseous mixture is obtained at least in part by decomposing a substance selected from the group consisting of ammonium metavanadate and ammonium chloride and the hydrogen chloride content of the second gaseous mixture is obtained at least in part from roaster gases produced by roasting a mixture of vanadium ore and sodium chloride in an oxidizing atmosphere.

3. A method of preparing a vanadium-containing product comprising the steps of roasting a mixture of ferrophosphorus and sodium chloride in a roasting zone having an oxiding atmosphere to solubilize the vanadium values and produce roaster gases containing gaseous hydrogen chloride, extracting roasted ore with an aqueous liquid to produce an aqueous medium containing dissolved vanadium values, adding excess ammonium chloride to an aqueous medium containing dissolved vanadium values to precipitate impure ammonium metavanadate, separating the precipitated impure ammonium metavanadate from the mother liquor containing the excess ammonium chloride, dissolving the crude ammonium metavanadate in an alkaline aqueous medium containing a compound selected from the group consisting of alkali metal hydroxides and carbonates, precipitating purified ammonium metavanadate from the alkaline aqueous medium by addition of excess substantially pure ammonium chloride, separating the purified ammonium metavanadate from the mother liquor containing the excess ammonium chloride, decomposing ammonium chloride present in at least one of the said mother liquors by addition of a base stronger than ammonium hydroxide and heating to evolve gaseous ammonia, decomposing the purified ammonium metavanadate by heating to evolve gaseous ammonia and produce a solid vanadium-containing product, passing a first gaseous mixture containing gaseous ammonia produced by at least one of the said steps for decomposing ammonium chloride and ammonium metavanadate into a first contacting zone, passing a second gaseous mixture containing the roaster gases into a second contacting zone, intimately contacting the first gaseous mixture in the first contacting zone with an aqueous medium to produce a first aqueous effluent containing absorbed ammonia, intimately contacting the second gaseous mixture in the second contacting zone with an aqueous medium to produce a second aqueous effluent containing absorbed hydrogen chloride, withdrawing the first aqueous effluent containing absorbed ammonia from the first contacting zone, passing at least a portion of the first aqueous effluent into the second contacting zone as the aqueous medium to be intimately contacted with the second gaseous mixture, withdrawing the second aqueous effluent containing absorbed hydrogen chloride from the second contacting zone, passing at least a portion of the second aqueous effluent into the first contacting zone as the aqueous medium to be intimately contacted with the first gaseous mixture, the first and second aqueous effluents containing ammonium chloride produced by reaction of the absorbed ammonia with the absorbed hydrogen chloride, withdrawing a first gaseous effluent from the first contacting zone having a lower gaseous ammonia content than was present initially in the first gaseous mixture, and withdrawing a second gaseous effluent from the second contacting zone having a lower content of the acidic substance than was present initially in the second gaseous mixture.

4. The process of claim 3 wherein at least a portion of the ammonium chloride used to precipitate the impure and purified amomnium metavanadate is obtained from at least one of the first and second aqueous effluents.

5. The method of claim 3 wherein the roaster gases contain entrained therein finely divided inorganic dust particles, and prior to passing the second gaseous mixture to the second contacting zone it is intimately contacted with an aqueous medium in a third contacting zone in an amount to remove the entrained dust particles without removing all of the acidic substance and to produce a third aqueous effluent containing the dust and the acidic substance.

6. The method of claim 5 wherein the third aqueous effluent containing the absorbed hydrogen chloride is withdrawn from the third contacting zone and passed to a fifth contacting zone and intimately contacted therein with the first gaseous mixture in an amount to neutralize the hydrogen chloride and produce an impure ammonium chloride solution without absorbing all of the gaseous ammonia, subsequent thereto the first gaseous mixture is passed to the first contacting zone, impure ammonium chloride produced in the fifth contacting zone is used to precipitate the impure ammonium metavanadate, and at least a portion of the ammonium chloride used to precipitate the purified ammonium metavanadate is obtained from at least one of the first and second aqueous effluents.

References Cited

UNITED STATES PATENTS

| | | | |
|---|---|---|---|
| 973,164 | 10/1910 | Burkheiser | 23—196 |
| 2,878,099 | 3/1959 | Breuing et al. | 23—2 |
| 3,259,455 | 7/1966 | Koerner et al. | 23—140 X |
| 3,294,481 | 12/1966 | Burwell | 23—18 |
| 3,320,024 | 5/1967 | Burwell | 23—18 |
| 3,346,329 | 10/1967 | Hermann | 23—18 X |

OSCAR R. VERTIZ, *Primary Examiner.*

E. C. THOMAS, *Assistant Examiner.*

U.S. Cl. X.R.

23—15, 18, 51, 100, 140, 154, 196

UNITED STATES PATENT OFFICE
CERTIFICATE OF CORRECTION

Patent No. 3,450,490                                June 17, 1969

John A. Hermann et al.

It is certified that error appears in the above identified patent and that said Letters Patent are hereby corrected as shown below:

Column 4, line 10, "coded" should read -- cooled --. Column 11, line 36, "chlorine" should read -- chloride --. Column 14, line 10, "initimately" should read -- intimately --; lines 23 and 29, "amomnia", each occurrence, should read -- ammonia --; line 40, "oxiding" should read -- oxidizing --. Column 15, line 20, "amomnium" should read -- ammonium --.

Signed and sealed this 10th day of March 1970.

(SEAL)
Attest:

Edward M. Fletcher, Jr.                          WILLIAM E. SCHUYLER, JR.
Attesting Officer                                     Commissioner of Patents